Aug. 6, 1957  J. Z. DE LOREAN  2,801,891
SEALING RING COLLAPSING MEANS AND METHOD
Filed June 29, 1954  2 Sheets-Sheet 1
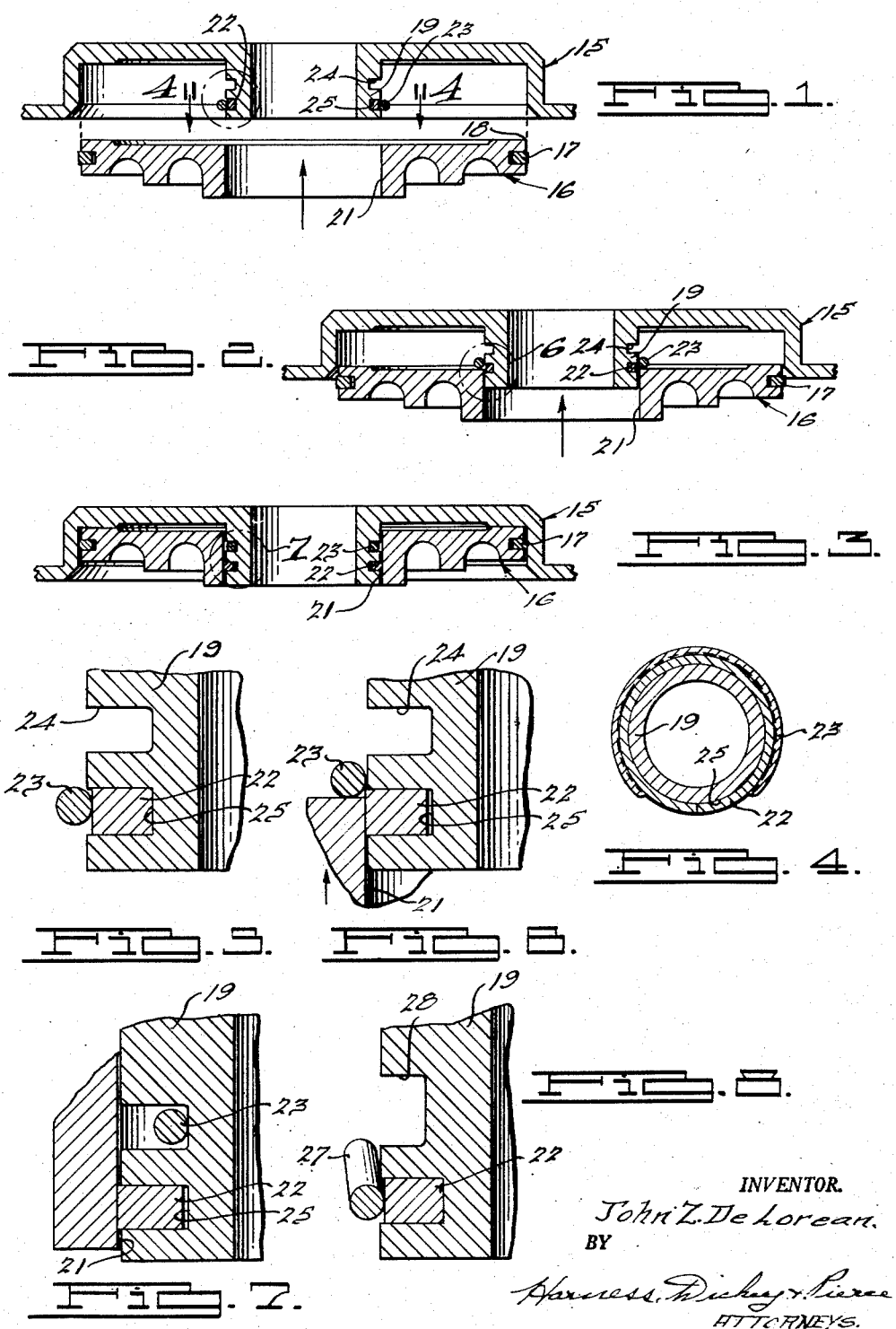
INVENTOR.
John Z. De Lorean.
BY
Harness, Dickey & Pierce
ATTORNEYS.

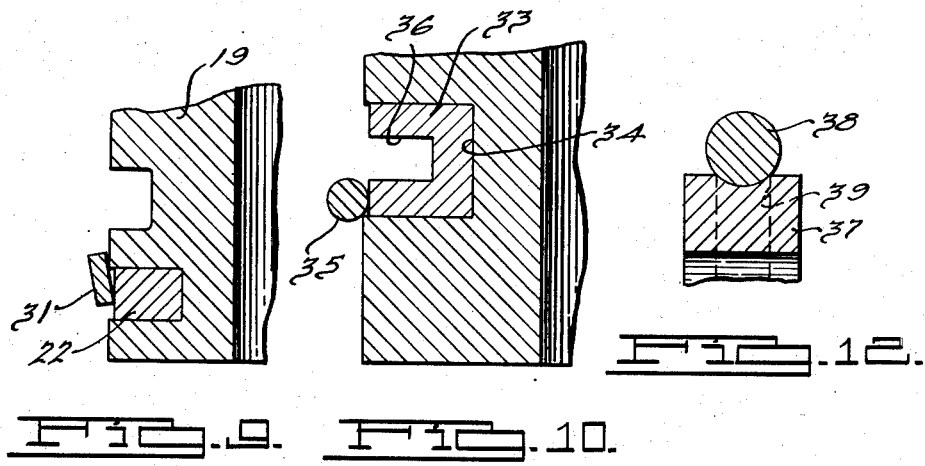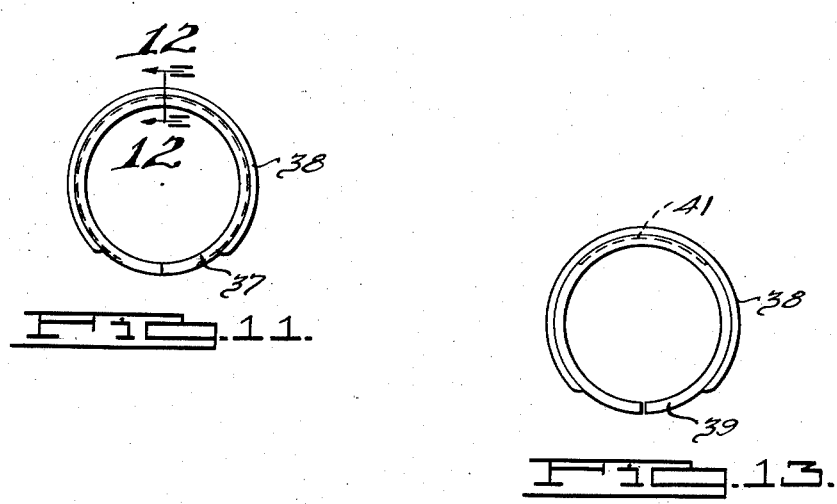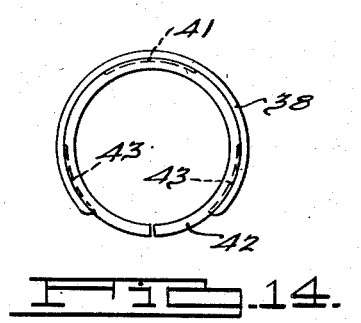

United States Patent Office 2,801,891
Patented Aug. 6, 1957

2,801,891

SEALING RING COLLAPSING MEANS AND METHOD

John Z. De Lorean, Detroit, Mich.

Application June 29, 1954, Serial No. 440,167

12 Claims. (Cl. 309—29)

This invention relates to sealing rings and methods, and particularly to a combination collapsing and sealing ring and method of assembly.

Difficulty has always been experienced when collapsing split sealing rings into the grooves of pistons at the time the piston is moved within a cylinder. This is particularly true in blind hole applications, and the present invention pertains to a sealing ring having a collapsing ring associated therewith which retains the sealing ring collapsed during the assembly of the piston within the blind ended cylinder. The sealing ring may be grooved to receive and retain the collapsing ring thereon, or the collapsing ring may be sinuously formed to extend over a portion of the piston while retaining the ring collapsed. Preferably an additional slot is provided adjacent to the sealing ring slot so that after the sealing ring is retained collapsed and the collapsing ring has moved therefrom, it will collapse into the adjacent groove and in no manner interfere with the operation of the piston or other element which is sealed thereby.

Accordingly, the main objects of the invention are: to provide a sealing ring with a collapsing ring which retains it in collapsed position; to provide a cylindrical element to be sealed with a slot for receiving the sealing ring and an adjacent slot for receiving the collapsing ring after the element has been moved into a cylinder; to provide a sealing ring with a groove in the outer wall in which the collapsing ring is retained until the cylinder moves the collapsing ring from engagement with the sealing ring permitting the sealing ring to engage the wall of the cylinder, and in general to provide a sealing and collapsing ring and a method of maintaining the sealing ring collapsed until engaged with the cylinder wall, all of which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Figure 1 is a sectional view of a piston and cylinder assembly having sealing means therefor embodying features of the present invention, with the cylinder and piston shown in a separated position;

Fig. 2 is a view of the structure illustrated in Fig. 1 with the piston and cylinder in partially assembled position;

Fig. 3 is a view of the structure illustrated in Figs. 1 and 2 with the cylinder and piston in complete assembled position;

Fig. 4 is a sectional view of the structure illustrated in Fig. 3, taken on the line 4—4 thereof;

Fig. 5 is an enlarged sectional view of the structure illustrated in Fig. 1, as viewed within the circle 5;

Fig. 6 is an enlarged sectional view of the structure illustrated in Fig. 2, as viewed within the circle 6;

Fig. 7 is an enlarged sectional view of the structure illustrated in Fig. 3, as viewed within the circle 7;

Fig. 8 is a view of structure, similar to that illustrated in Fig. 5, showing a further form which the invention may assume;

Fig. 9 is a view of structure, similar to that illustrated in Fig. 5, showing still another form of the invention;

Fig. 10 is a view of structure, similar to that illustrated in Fig. 5, showing still a further form which the invention may assume;

Fig. 11 is a plan view of a sealing and collapsing ring assembly embodying features of the present invention;

Fig. 12 is an enlarged sectional view of the structure illustrated in Fig. 11, taken on the line 12—12 thereof;

Fig. 13 is a view of structure similar to that illustrated in Fig. 11, showing a different form thereof, and Fig. 14 is a view of structure similar to that illustrated in Fig. 11, showing a still further form which the invention may assume.

Referring to Figs. 1 to 7, inclusive, a cylinder 15 is illustrated in which a piston 16 is to be inserted. A piston ring 17 is disposed in an annular slot 18 in the piston peripheral wall and is collapsed by suitable tools (not shown) when the piston is moved within the cylinder. The cylinder 15 has a concentric piston 19 which mates with a blind end cylinder 21 of the piston 16. A ring 22, which is to seal with the wall of the cylinder 21, is inaccessible and cannot be reached by a collapsing tool. Applicant has provided a sealing ring 22 having a collapsing ring 23 associated therewith to retain the sealing ring collapsed while the piston 19 is being inserted into the cylinder 21. In order to dispose of the ring 23 as it is moved from engagement with the sealing ring 22, an annular slot 24 is provided in the piston wall adjacent to the slot 25 in which the sealing ring 22 is disposed.

As the piston 19 advances into the cylinder 21, the collapsing ring 23 is moved from engagement with the sealing ring 22 while the sealing ring is retained from expanding by the wall. The continued movement of the piston 19 into the cylinder 21 advances the collapsing ring 23 until it collapses into the annular slot 24 out of contact with the cylinder wall 21. It will be seen in Fig. 2 that the sealing ring 22 is confined by the wall of the cylinder 21 and that the collapsing ring 23 is advanced along the wall of the piston 19 out of engagement with the sealing ring 22. In Fig. 3 the collapsing ring is shown disposed within the slot 24 and out of engagement with the wall of the cylinder which is sealed by the sealing ring 22. This same relationship is illustrated in Figs. 5, 6 and 7, Fig. 5 showing the ring 22 collapsed within the slot 25 by the collapsing ring 23, Fig. 6 showing the cylinder 21 engaged by the sealing ring 22 and the collapsing ring 23 advanced toward the slot 24, while Fig. 7 shows the collapsing ring 23 disposed within the slot 24. Fig. 4 shows the sealing ring 22 disposed within the slot 25 and retained collapsed by the collapsing ring 23.

Various means may be provided for retaining the collapsing ring in position to retain the sealing ring collapsed. In Fig. 8 a sealing ring 27 is illustrated as being of corrugated form, having parts thereof engaging the sealing ring 22 and other parts thereof engaging the annular wall of the piston 19. In this relationship an adjacent slot 28 is widened so that the wide corrugated ring can collapse therein when pushed from a position of engagement with the sealing ring 22. In this arrangement, the corrugated ring 27 need not be accurately positioned to effectively collapse the ring 22.

In Fig. 9 a flat collapsing ring 31 is illustrated which functions in the same manner as the corrugated ring 27 having a portion thereof engaging the sealing ring 22 and retaining it in collapsed position while another portion thereof rests upon the face of the piston 19.

In Fig. 10 a sealing ring 33 is illustrated of greater width disposed in a wider slot 34 in the piston wall. A collapsing ring 35 similar to the collapsing ring 23 retains the sealing ring 33 collapsed until engaged by the wall of the cylinder. The sealing ring has a central slot 36 of sufficient width to receive the collapsing ring 35 into which the latter is moved as the piston is advanced into the cylinder.

In Figs. 11 and 12 a sealing ring 37 is illustrated having a collapsing ring 38 secured thereto. In this relationship the sealing ring has an arcuate groove 39 therein to accurately center the collapsing ring 38 and retain it in unit relation to the sealing ring until forcibly pushed therefrom by the cylinder as the piston is advanced thereto.

In Fig. 13 a sealing ring 39 is illustrated having a collapsing ring 38 secured thereto and retained in operative relationship therewith by an arcuate groove 41 which extends over an arcuate area of approximately 90 degrees opposite to the abutted ends of the ring 39.

In Fig. 14 sealing ring 42 is illustrated having a collapsing ring 38 secured thereon engaged in an arcuate recess 41 opposite to the abutted ends of the ring 42 and in two arcuate recesses 43 which are adjacent to said abutted ends. In any of the constructions, the sealing and collapsing rings are retained in unit engagement and the piston or the sealing ring is provided with an annular slot into which the collapsing ring is moved after the sealing ring has engaged the cylinder wall and is retained collapsed thereby in sealing relation therewith.

What is claimed is:

1. The method of securing a piston ring within the bore of a cylinder which includes the steps of: maintaining the sealing ring in collapsed position within a groove of the piston by a band disposed thereabout, and moving said band into an adjacent groove in the piston wall as the piston is inserted within the cylinder and the sealing ring engages the wall thereof.

2. The method of securing the surface of a sealing ring in engagement with the surface of a bore after being disposed within a groove of a piston which includes the steps of: maintaining the sealing ring collapsed within the groove by a band disposed thereabout, and moving the band into a groove extending inwardly from the surface of the sealing ring after the sealing ring has been engaged by the bore surface.

3. The method of engaging the surface of a sealing ring with a bore surface after the sealing ring has been disposed in a groove in a piston which includes the steps of: retaining the sealing ring collapsed within the groove by a band disposed thereabout and about the adjacent portion of the piston, and moving said band from said sealing ring along the piston as the latter is inserted within the bore and after the surface of the sealing ring is engaged thereby to permit said band to move into an adjacent groove in the surface of the piston out of contact with the surface of the bore.

4. A piston assembly including a piston portion adapted to be inserted into a cylinder under blind hole conditions wherein said piston portion is inaccessible to conventional externally applied collapsing tools, said piston portion having a split substantially cylindrical sealing ring and a substantially cylindrical collapsing ring about said sealing ring holding the split ends in substantial abutting relation until the collapsing ring is moved therefrom when the sealing ring is moved into sealing position.

5. The subject matter as claimed in claim 4 including a groove in said sealing ring in which said collapsing ring is retained until moved therefrom when the sealing ring is moved into sealing position.

6. The subject matter as claimed in claim 4 including a groove in said sealing ring opposite to said split ends with which a portion of the collapsing ring engages but which is moved therefrom when the sealing ring is in sealing position.

7. The subject matter as claimed in claim 4 including a groove in said sealing ring in its outer peripheral wall opposite to the split ends and grooves in said wall adjacent to said split ends, said collapsing ring having portions disposed in said grooves from which it is moved when the sealing ring is in sealing position.

8. A piston assembly including a piston portion adapted to be inserted into a cylinder under blind hole conditions wherein said piston portion is inaccessible to conventional externally applied collapsing tools, said piston portion having a pair of adjacent annular grooves therein, a sealing ring in one of said grooves having a collapsing ring thereabout for retaining the sealing ring in collapsed position, said adjacent groove receiving said collapsing ring after said piston portion is disposed within a cylinder and said sealing ring is in engagement with the inner wall thereof.

9. The subject matter as claimed in claim 8 wherein the outer peripheral wall of said sealing ring contains a groove in which said collapsing ring is retained until moved into said adjacent groove.

10. The subject matter as claimed in claim 8 wherein said collapsing ring has substantial width so that a portion thereof engages the sealing ring to retain it in collapsed position while another portion thereof rests upon the piston portion adjacent to the groove containing said sealing ring over which it is moved into said adjacent groove.

11. The subject matter as claimed in claim 10 wherein said collapsing ring is made of wire bent into sinuous shape to provide the width thereto.

12. The subject matter as claimed in claim 8 wherein said sealing ring has split ends and has a groove extending inwardly from the peripheral wall thereof, said collapsing ring being disposed on the peripheral wall of said sealing ring adjacent to said groove for retaining it in a collapsed position, the width and depth of said groove being such as to receive said collapsing ring when moved toward the groove from the wall of said sealing ring as the sealing ring is moved to sealing position.

References Cited in the file of this patent

UNITED STATES PATENTS

| | | |
|---|---|---|
| 1,796,882 | Bowers | Mar. 17, 1931 |
| 2,495,871 | Stewart | Jan. 31, 1950 |
| 2,607,644 | Smith et al. | Aug. 19, 1952 |
| 2,615,769 | Barnes et al. | Oct. 28, 1952 |
| 2,625,413 | Christensen | Jan. 13, 1953 |